United States Patent Office 3,524,871
Patented Aug. 18, 1970

3,524,871
SEQUESTERING SOLVENT PROCESS FOR THE PRODUCTION OF METHYLENE BIS THIOCYANATE
Joseph Matt, Chicago, Ill., assignor to Nalco Chemical Company, Chicago, Ill., a corporation of Delaware
No Drawing. Filed May 23, 1967, Ser. No. 640,558
Int. Cl. C07c *161/02*
U.S. Cl. 260—454          8 Claims

ABSTRACT OF THE DISCLOSURE

The present invention relates to an improvement in the general process of producing methylene bis thiocyanate (MT) by the following equation:

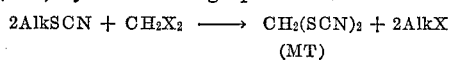

where Alk=Na$^+$K$^+$.

It has now been found that the use of certain water-immiscible reaction solvents in percent by weight greater than any water or miscible reaction solvents used or added gives improved yields and freedom from polymer formation in the product. Although operable for many hydrophobic or immiscible solvents of safe flash point and operable boiling point, it has been further found that the cyclic aromatics—benzene, toluene, xylene, and cymene (BTX solvents), give optimum results and superior polymerfree yields when compared with equivalent concentrations of water-miscible solvents, such as lower aliphatic alcohols, ketones, etc. Finally, where the BTX solvents are used in the range greater than 50% and less than 80% by weight of total solvent or in the optimum range of about 55-70%, optimum efficacy is attained in obtaining a superior off-white MT with an M.P. of 103–106° C.

Additionally, it has been found that in utilizing the present immiscible solvent system, it was optional but beneficial to neutralize the reaction mixture by adjusting the mixture from the reaction termination point of about a pH 2→about pH 6.6–7 to facilitate recovery of methylene bis thiocyanate (MT).

Finally, it has been found to be optional but beneficial to include in the reaction mixture an aromatic monocyclic diketone or diphenol such as a hydroquinone type stabilizer and oxidation inhibitor for bromine, HCN and other unwanted products of side reactions.

THE PRIOR ART

Variation of critical process limitations, such as providing a temperature limitation with a completely aqueous solvent medium for the dihalomethane reactant and MT formed during the reaction, is taught in the related copending application, S.N. 604,122, filed Dec. 23, 1966, entitled "Method for Preparing Methylene Bis Thiocyanate" of Matt et al.

In the type reaction of the present invention which comprises reacting a dihalo methane with an alkali metal thiocyanate (AlkT) to produce the desired methylene bis thiocyanate (MT), the prior art has consistently directed itself towards predominantly aqueous, polar and hydrophilic reactions solvents systems for the sparsely water soluble MT. For example, Allen JACS 57, (volume 57), page 198 (1935) produced aliphatic thiocyanates by reacting potassium thiocyanate with dibromo methane in an alcohol solution. Later Yoreda et al. "Kogyo Kagaku Zasshi" 65, page 1818 (1962) produced alkaline thiocyanates by substituting dimethyl formamide or dimethyl sulfoxide as a solvent. Belgian Pat. 683,102, Sumitomo Chemical Company (1967) utilizes an aqueous solvent containing optionally a maximum of 25% by weight per total weight of a water miscible compound selected from lower alcohols like ethyl, lower ketones, such as acetone, and hydroxy compounds, such as ethylene glycol.

Relative to the product of the invention, it is to be noted that this product of the improved process of the present invention has evoked much interest, due to its recently discovered properties as an algaecide and as a bactericide for sulfate reducing bacteria. U.S. Pats. No. 3,252,855 and 3,300,375 to Wehner and No 3,306,810 to Buckman et al. are all devoted to methylene bis thiocyanate and its activity as an industrial microbiocide. The patent and literature art ponit out that uniquely methylene bis thiocyanate is active against many different bacteria and algae in a concentration of only few parts per million which, considering its relatively low unit cost, makes it an ideal active compound for agriculture and other industrial compositions.

THE SOLVENT MEDIUM

In the past, it has been customary to add water plus a minor amount of a miscible or hydrophilic organic solvent to the methylene dihalide reactant to solubilize the reactant as well as the MT product. Since the particular alkali metal reactant in this process is conventionally in aqueous solution, these prior art solvents were aqueous solvents containing hydrophilic organic additives miscible with water. Preferred known water-miscible solvents included acetone, methanol, ethanol, dimethyl formamide, etc.

Although substantially water-immiscible or hydrophobic solvents are generally operable in this process as added reaction solvents, the group of sequestering solvents consisting of cyclic aromatics of the benzene series, such as benzene, toluene, xylene and cymene, (also known as the BTX series) are optimum and preferred as solvents during the reaction. Other groups of solvents of limited miscibility with water are operable such as the cycloaliphatics (e.g. cyclo-hexane), aliphatic halogenated methane and ethane compounds (e.g. chloroform and trichloroethylene), and less soluble ketones (e.g. methyl isobutyl ketone (MIBK) and cyclohexanone) and glycol derivatives (such as ethylene glycol).

However, it has been found that the BTX aromatics show uniformly high yields coupled with freedom from polymer formation. In particular, comparison testing of these compounds with ketones, such as acetone, methyl ethyl ketone (MEK) methyl isobutyl ketone (MIBK) showed that sporadic high yields for the ketones were coupled with a polymer-tainted colored product. Since the alkali metal thiocyanate reacant as contrasted with ammonium thiocyanate is fairly stable, the difference in polymer formation must be laid to the more effective sequestering action of the BTX solvent on methylene bis thiocyanate. Jordan in "The Technology of Solvents," Technical Service Library, London, 1932, describes the BTX series as very hydrophobic and layer forming and the halogenated methane series is only described as slightly polar and also hydrophobic. The preferential mutual solubility of the BTX solvent with the MT product thus gives rises to the sequestering effect. This characteristic, coupled with adequate flash point safety and boiling point, fits the BTX compounds used uniquely to this reaction.

By comparison of yields using KSCN and chlorobromethane reactants where the organic solvents were similar in weight and present in the amount >50%<80% by weight of total solvent, the following results were obtained as yields: Xylene 69%, MIBK 53%, trichlorethylene 35% and methyl ethyl ketone (MEK) 11%.

Again comparing yields using NaSCN and chlorobromomethane where the organic solvents were similar in weight and were present in amount >50%<80% by weight of total solvent, the following results were obtained as yields: Toluene 50%, ethyl alcohol (ETOH) 13.4%, acetone 9.6%.

Finally, in an experiment using NaSCN and dibromomethane the yields were as follows: Toluene 67.7%, acetone 61.5%, ethanol 52%. The results suggest that the superiority of the substantially water-immiscible solvents is narrowed when the preferred dibromomethane is used, due to the inherent activity of the preferred dibromo reactant in most solvents.

Table I below shows reactions of chlorobromomethane (MCB) with aqueous KSCN (50%) with added substantially water-immiscible solvent (BTX) present in $$>50\% <80\%$$

by wt./total wt. of solvent.

The table shows the efficacy of the BTX solvents, toluene and xylene in the reaction. It is noted that in Experiment 103, where ligroin, a $C_6$–$C_7$ aliphatic petroleum fraction was used, the yields were adversely effected. In 112 when a double volume of toluene was used pushing the percent toluene/total near the upper operating limit, the yield dropped as compared to the corresponding 111 where a single volume of toluene was used.

TABLE I

| Run No. | KSCN/MCB in moles | Solvent | Percent organic solvent by wt. to total solvent | Time, hrs. | Temp., °C | Percent yield |
|---|---|---|---|---|---|---|
| 101 | 3.33 | Xylene | 57.8 | 13 | 85 | 69 |
| 102 | 3.33 | Toluene | 57.4 | 24 | 80 | 60 |
| 103 | 3.33 | Ligroin | 53.0 | 24 | 80 | 22 |
| 104 | 2.2 | Toluene | 67.2 | 16 | 90 | 62 |
| 105 | 3.33 | do | 57.2 | 16 | 90 | 61 |
| 106 | 3.33 | do | 57.2 | 16 | 90 | 60 |
| 107 | 3.33 | do | 57.2 | 16 | 90 | 64 |
| 108 | 3.33 | do | 57.2 | 20 | 90 | <65 |
| 109 | 3.33 | do | 57.2 | 24 | 90 | 65 |
| 110 | 3.0 | do | 62.0 | 15 | 90 | 60 |
| 111 | 2.2 | do | 66.8 | 15 | 90 | 60 |
| 112 | 2.2 | Toluene (double volume) | 79.5 | 15 | 90 | 46 |

It is theorized that the cyclic aromatics of the benzene series particularly serve to sequester the newly formed or nascent methylene bis thiocyanate (MT) which is sensitive and subject to degradation and polymerization. The reaction proceeds from a pH of about 5→2 and the sequestering solvent encapsulates the MT formed during the course of the reaction. Such a solvent protects the product from attack by acid, water and salt by a sequestering action during the reaction.

Contrastingly in the prior art, these additives lipophilic miscible solvents were designed to solubilize the sparsely soluble MT and were added in amounts <50% by weight so that the controlling component was water and these prior art systems were aqueous solvent systems.

The present invention is divergent from the prior art teachings. It is designed to use a hydrophobic solvent system where >50% by weight is a hydrophobe or oleophile and thus properly comprises a substantially immiscible organic solvent base for the reaction rather than an aqueous base. The preferred percent range of solvent is >50<80% by weight of total solvent weight, and the optimum range is about 55–70%.

As a rough measure, for generally operating, a volume of substantially immiscible reaction solvent of from 125–500 ml./mol of dihalomethane reactant is operable for the process.

THE THIOCYANATE REACTANT

The present reaction may be viewed as between a thiocyanate (AlkSCN) and a dihalo methane $CH_2X_2$. Alternatively, the latter may be expressed in nomenclature as a methylene halide.

In the aforementioned copending application Ser. No. 602,122, it was noted that in the general thiocyanate reaction, the alkaline earth metals were inoperable or too expensive. Therefore, for purposes of this specification, alkali metal thiocyanate excludes the ammonium and consists of the alkali metal ions, sodium ($Na^+$) and potassium ($K^+$). Cesium ($Cs^+$), rubidium ($Rb^+$) and lithium ($Li^+$) are excluded from the present definition as too rare and costly, although operable.

THE DIHALOMETHANE REACTANT

As taught in the copending application Ser. No. 604,122 noted above, the dihalomethane reactant for the production of methylene bis thiocyanate (MT) is preferably dibromomethane and this compound illustrates a preferred class of reactants where the halo constituents are similar. Also operable is diiodomethane. Operable, but not preferred, are mixed dihalomethanes, such as chlorobromomethane, $CH_2ClBr$, bromoiodomethane, $CH_2BrI$, and chloroiodomethane $CH_2ClI$. In any event, it is desired that at least one, and preferably both of the dihalo constituents be either bromo or iodo. In other words, dichloromethane and difluoromethane are not preferred.

REACTION TIME AND TEMPERATURE

The broad operational range of reaction time is 8–24 hours and, typically, as with many organic reactions lower temperatures used in the reaction require longer times. However, by using the optimum conditions, a reaction time of 8–16 hours may be achieved.

In general, the temperatures employed in the present process when an organic reaction solvent is added are higher than in strictly aqueous solution or in those processes involving addition of a minor amount of a water miscible solvent. The process is operable from a minimum of about 75° C. and up to about 95° C. An optimum temperature is about 90° C. and uniform heating, such as a surrounding steam bath, is preferred to avoid unevenness caused by "hot spots."

MOL RATIOS

The formula for the present reaction is as follows: 2AlkSCN+alternatively $CH_2XY$ (mixed dihalo, where X and Y are dissimilar halides and X or Y is preferably Br— or I—) or $CH_2X_2$ (dibromomethane, etc.)→$CH_2(SCN)_2$+2AlkX Empirically, the above equation calls for 2 mols of AlkSCN. Actually, to drive the reaction towards the right, a slight molar excess of alkali metal thiocyanate (AlkSCN) is necessary and a somewhat greater excess is preferred. Where a similar dihalo methane is used, such as dibromomethane, an optimum mol ratio is 2.6 to 1, whereas with a mixed dihalo compound (i.e. chlorobromomethane) a 3.6 to 1 ratio of thiocyanate to dihalomethane is necessary to obtain an optimum yield of MT. Too much AlkSCN reactant clutters the MT product with an undesired excess of inorganic salts. Therefore, an operable molar range for the AT reactant is >2 and <4 moles per mole of organic halide reactant.

The AlkSCN reactant is conventionally used in aqueous solution. It has been found operable to use as limits a 45-60% strength of solution with an optimum range of 45-50%.

PURIFICATION AND RECOVERY

Where the product is fouled by polymer formation, inorganic salts, or when necessary, especially where mixed halides are used, the MT product may be recovered in pure form, preferably using a water-miscible purification solvent. Lower aliphatic alkanols are preferred and a 80% aqueous solution is isopropanol is the solvent of choice. The solvent/$H_2O$ ratio may vary from 1 to 10 to 10 to 1 with a preferred ratio of about 1 to 5. The permissible variation of solvents include other substantially water-miscible lower alkanols, such as methanol and n-propanol, etc. as well as other classes of water-soluble solvents, such as ketones like acetone and methyl ethyl ketone (MEK) and amides, like N,N-dimethyl acetamide, and dimethyl sulfoxide. When the preferred reactant $CH_2Br_2$ is used, the use of a purification solvent may often be omitted.

The limited miscibility solvents, such as toluene, which are preferred for the reaction stage of the process, are operable but not preferred in the purification phase of the process. The theory of the divergent type of solvent used in the reaction phase is that a slightly miscible solvent, such as toluene, is utilized to sequester and protect the newly formed or nascent MT from heat and acid whereas, in purification, a water-miscible solvent, such as isopropanol, is used to guarantee solubility for recrystallization purposes for the sparsely water-soluble MT.

POST REACTION ADJUSTMENT OF THE pH OF THE AQUEOUS LAYER

It has been determined that at the beginning of the reaction the aqueous portion of the reaction medium (solvent) is at the moderately acid pH of 5, while at the end of the reaction this pH is strongly acid at 2. Furthermore, it appears that the MT in the aqueous layer will be less soluble in a neutral solution and the cross solubility of the reactants will be depressed. Therefore, although optional in the process involving the substantially immiscible reaction solvent including a minor aqueous phase, it has been found beneficial to suitably neutralize the aqueous reaction medium after the reaction is completed, but prior to extraction, to a pH of about 6.6–7.0. This refinement of technique has increased yields of MT at least 3–5%, which is a substantial amount in a commercial process. The neutralization may be effected by any suitable alkalizing agent, such as NaOH, KOH, etc.

INHIBITORS

The present process is fraught with a few minor difficulties or "bugs," which in the main are derived from the fact that the SCN— group is unstable. Thus, in certain runs, the HSCN present in the acid medium tends to trimerize and decompose to HCN and the Br— tends to appear as HBr or $Br_2\uparrow$. It has been found beneficial in practicing this process to add as a stabilizer or oxidation inhibitor, a minor but effective amount of an aromatic diketone, diphenol, nitro benzene or related compound. Such aromatic oxy, oxo or nitro compound may be selected from hydroquinone monomethyl ether, t-butyl catechol, hydroquinone, p-benzoquinone, chloranil, o-nitrophenol, 2,4 dinitrophenol, m-dinitro benzene, α nitroso-B-naphthol and the like.

A preferred stabilizer is a benzene diol selected from the group consisting of hydroquinone, hydroquinone monomethyl ether and pyrocatechol.

EXAMPLE I

Comparison of several solvents in the KSCN-chlorobromomethane reaction

A solution of 32.25 g. (0.333 m.) of potassium thiocyanate in an equal weight of water was heated at 85° C. for 15 hours on a steam bath with 12.95 g. (0.1 m.) of chlorobromomethane (MCB) and 50 milliliters of each of the following added organic solvents:

In experiment A the solvent was methyl ethyl ketone (56% by wt. of total solvent)

In experiment B the solvent was methyl isobutyl ketone (56% by wt. of total solvent)

In experiment C the solvent was xylene (58% by wt. of total solvent)

In experiment D the solvent was trichloroethylene (69% by wt. of total solvent.

The reaction mixture was then evaporated in air, salts were removed in water and the desired product, methylene bis thiocyanate, was extracted from the organic residue with hot benzene.

The following yields of methylene bis thiocyanate, substantially pure, resulted. The product was identified by infrared and melting point (104° C.).

In A, the methy ethyl ketone solvent gave 1.5 grams of the product or 11.5% yield.

In B, the methyl isobutyl ketone gave 7 grams of product or 54% yield.

In C, the xylene solvent gave 9 grams of product and 69% yield.

In D, the trichloroethylene solvent gave 4.5 grams of product or 35% yield.

It was noted that with respect to the product from the methyl ethyl ketone (MEK) a substantial amount of intermediate chloromethyl thiocyanate was present. Furthermore with respect to both the ketone solvents A and B, there was some polymer formed. It is noted that the methyl isobutyl ketone is a borderline solvent with mixed hydrophobic and hydrophilic properties.

EXAMPLE II

Comparison of several solvents in NaSCN-dibromomethane reaction

Three runs were made side by side using:

(A) 100 ml. toluene (87 gms.), representing 67% of solvents (B) 100 ml. acetone (79 gms.), representing 65% of the solvents (C) 100 ml. ethanol (79 gms.), representing 65% of the solvents A solution of sodium thiocyanate (42.6 g., 0.6 m.) in an equal weight of water was refluxed for 16 hours on the steam bath with dibromomethane (35 g., 0.2 m.) in the stated solvents. At the end of this period, about 100 ml. of cold water was added, the mixtures were cooled to 5° C., filtered, and the filtrates further cooled to obtain more product. (In Expt. (A), the toluene layer was separated from the filtrate and evaporated to obtain dissolved product.)

The solids in each experiment were recrystallized from a 20:80 (by weight) mixture of isopropyl alcohol and water, with the following yields of methylene bis thiocyanate:

(A) 17.2 g.=66.7% _____ 102–4° C. (toluene run).
(B) 16 g.=61.5% _____ 103–5° C. (acetone run).
(C) 13.5 g.=52% _____ 103–5° C. (ethanol run).

Thus, there is a measurable superiority of toluene over the other solvents in increasing the yield. In the acetone Expt. B, there was measurable polymer formed.

EXAMPLE III

Comparison of several solvents in NaSCN-chlorobromomethane reaction

The value of three solvents in promoting the reaction of bromochloromethane and sodium thiocyanate was determined as follows: Solutions of NaSCN (42.6 g. 0.6 m.) in equal weights of water were heated with stirring for 16 hours on a steam bath with solutions of bromochloromethane (26 g. 0.2 m.) in the following solvents:

(A) toluene _____ 100 ml. 87 g., representing 67% of total solvents.
(B) acetone _____ 100 ml. 79 g., representing 65% of total solvents.
(C) ethanol _____ 100 ml. 79 g., representing 65% of total solvents.

The reaction mixtures were then diluted with water, chilled to 5° C., filtered, and the filtrates chilled further for more product. (In the case (A), the toluene was evaporated separately to obtain its solute.) The solids in each case were recrystallized from six parts of a 20:80 (by weight) isopropyl alcohol-water mixture. The following yields of MT resulted:

(A) 13 g. 50% M.P. 105° C. (toluene run)
(B) 2.5 g. 9.6% M.P. 102° C. (acetone run)
(C) 3.5 g. 13.4% M.P. 101° C. (ethanol run)

EXAMPLE IV

The application of the hydroquinone type stabilizer and the neutralization of the aqueous reaction medium prior to extraction of MT 7.5 g. of KI was dissolved in 1725 g. of 47% NaSCN solution (Du Pont, technical). Bromochloromethane (388.5 g. 3.0 m.) (Dow technical) and hydroquinone monomethyl ether (3.85 g.) in toluene (750 ml.) were added. The mixture was stirred rapidly (550 r.p.m.) in a 5-liter flask on a steam-bath in a hood, for 20 hours, using efficient reflux condensers (B.P. of bromochloromethane is 67° C.). The mixture gradually darkened during the heating.

At the end of the heating, one liter of hot water and 750 ml. of hot toluene were added to decrease the cross solubility of the reactants and the reaction mixture was filtered hot to remove any polymer (14 g.). The upper oragnic layer was separated. The aqueous layer was neutralized to a pH of about 6.7 and was then extracted while hot with 750-ml. portion and four 500 ml. portions of toluene and all organic layers were combined.

Organic layers were freed of any separated water and clarified while hot with 37.5 g. of Supercel adsorbent. The clear filtrate was concentrated in vacuo at moderate temperatures (50–60° C.) to about ⅙ of its original volume. The light yellow MT which separated was filtered cold and the filtrates were chilled to 5–10° C. for further amounts of crystal product. The mother liquor can be further concentrated if desired, since it contains the MT product and the intermediate chloromethyl thiocyanate.

The yield of MT product was 263 g., M.P. 104° C., 67.4% of theoretical, and testing was satisfactory by melting point and infra red spectrum.

What is claimed is:

1. A process for the production of methylene bis thiocyanate by reacting a stoichiometric excess of aqueous alkali metal thiocyanate with a dihalomethane selected from $CH_2XY$ where $X=I$, Br, Cl, F and $Y=I$, Br, Cl, F and at least one X or Y must be I or Br and where X and Y must be different, for a period of about 8–24 hours at a temperature of about 75°–95° C. in the presence of a substantially water immiscible solvent selected from the group consisting of benzene, toluene, xylene, and cymene, said immiscible solvent being present in a range of $>50<80\%$ by wt. of total wt. of solvent, and separating and recovering the product methylene bis thiocyanate.

2. A process according to claim 1 wherein said water immiscible solvent is toluene.

3. A process according to claim 1 wherein the solvent range in wt. percent is about 55–70% by wt. of total wt. of solvent.

4. A process according to claim 1 wherein after the reaction is completed and prior to separating and recovering the pH of the aqueous layer is adjusted to about 6.6–7.0.

5. A process according to claim 1 wherein a minor amount of an oxidation inhibitor is added to the reaction mixture.

6. A process according to claim 1 wherein a minor amount of a benzene diol oxidation inhibitor selected from the group consisting of hydroquinone, hydroquinone monomethyl ether and pyrocatechol is added to the reaction mixture.

7. A process for the production of methylene bis thiocyanate (MT) by reacting $>2<4M$ quantities of an alkali metal thiocyanate in a minor amount of aqueous solvent with 1M quantity of a dihalomethane selected from $CH_2XY$ where $X=I$, Br, Cl, F and $Y=I$, Br, Cl, F and at least one X or Y must be I or Br and where X and Y must be different, in a major amount of a substantially water immiscible organic solvent selected from the group consisting of benzene, toluene, xylene, and cymene comprising $>50<80\%$ by wt. of total solvent for about 8–24 hours at a temperature of about 75°–95° C. and separating and recovering said MT.

8. A process according to claim 7 wherein the substantially water immiscible oragnic solvent is a solvent selected from the group consisting of benzene, toluene, xylene, and cymene and comprises about 55–70% by wt. of total wt. of solvent.

References Cited

UNITED STATES PATENTS

| 2,372,809 | 4/1945 | Bruson _____ 260—454 |
| 2,801,261 | 7/1957 | Hornberger _____ 260—454 |
| 2,855,339 | 10/1958 | Klopping _____ 260—454 XR |
| 2,939,875 | 6/1960 | Floria _____ 260—454 |
| 3,433,737 | 3/1969 | Wehner _____ 260—454 XR |

LEWIS GOTTS, Primary Examiner

G. HOLLRAH, Assistant Examiner

U.S. Cl. X.R.

11—67, 104; 424—302